(12) United States Patent
Bosik et al.

(10) Patent No.: US 6,987,840 B1
(45) Date of Patent: Jan. 17, 2006

(54) INTEGRATED MESSAGE MANAGEMENT METHOD AND SYSTEM

(75) Inventors: Barry S. Bosik, Marlboro, NJ (US);
James C. Ehlinger, Colts Neck, NJ (US); Amit Garg, Howell, NJ (US);
Rajeev B. Patil, Holmdel, NJ (US);
Jeffrey L. Tuttle, Hazlet, NJ (US)

(73) Assignee: AT&T Corp., New York, NY (US)

( * ) Notice: Subject to any disclaimer, the term of this patent is extended or adjusted under 35 U.S.C. 154(b) by 746 days.

(21) Appl. No.: 09/992,234

(22) Filed: Nov. 6, 2001

(51) Int. Cl.
*H04M 1/64* (2006.01)
*H04M 11/00* (2006.01)

(52) U.S. Cl. .............................. 379/88.17; 379/88.14; 379/88.25

(58) Field of Classification Search ............. 379/88.17
See application file for complete search history.

(56) References Cited

U.S. PATENT DOCUMENTS

| | | | |
|---|---|---|---|
| 5,647,002 A | 7/1997 | Brunson ..................... 380/49 |
| 6,018,762 A * | 1/2000 | Brunson et al. ............ 709/206 |
| 6,233,318 B1 * | 5/2001 | Picard et al. ............ 379/88.25 |
| 8,697,458 * | 2/2004 | Kunjibettu ............... 379/88.17 |
| 6,792,085 B1 * | 9/2004 | Rigaldies et al. ........ 379/88.13 |

* cited by examiner

*Primary Examiner*—Fan Tsang
*Assistant Examiner*—Joseph T Phan

(57) ABSTRACT

An integrated message management system that allows a subscriber to retrieve voice mail messages using a voice mail or email server, and that also updates the status of messages on both servers upon retrieval of the message from either server. The voice mail server is accessed via a local exchange carrier, whereas the email server is accessed via the Internet. The email server also notifies the subscriber of the presence of a new message. When the subscriber retrieves a voice mail message, the email server updates the status of the corresponding email message. Similarly, when a subscriber retrieves an email message, the voice mail server updates the status of the corresponding voice mail message. This eliminates the need for a subscriber to manually change the status of corresponding messages to "clean out" a voice mail or email box when the other is accessed.

5 Claims, 8 Drawing Sheets

INTEGRATED MESSAGE MANAGEMENT METHOD AND SYSTEM

BACKGROUND OF THE INVENTION

The present invention relates to messaging systems, but more particularly to a method and an apparatus that provide cross-management of voice mail and email messages.

In communication networks, some messaging systems allow subscribers to receive messages of different type by accessing, for example, only one of his or her voice mail and email servers when the two servers were linked together. Retrieving them was sometimes inconvenient because neither messaging system provided updating of the status of messages on one messaging system that were already retrieved from the other messaging system. For example, if a user retrieves, using an email service, a transcribed voice mail message and deletes the email message after retrieval, the original voice mail message would still be considered a new message on the voice mail system. The user must manually effect deletion of the messages on the voice mail server, or deal with the potential confusion of not knowing which voice mail messages are actually new, or which voice mail messages have actually been retrieved through the email service.

To help address some of these concerns, U.S. Pat. No. 5,647,002 by Brunson discloses a system for synchronizing different types of mailboxes. The Brunson patent describes a synchronizer that synchronizes separate email and voice mail mailboxes.

The present invention, however, better addresses synchronization concerns by providing an integrated message management system allowing more direct control of the synchronization process. The present invention also provides an advance in the art by additionally detecting the on-line presence of a subscriber in providing message notification.

SUMMARY OF THE INVENTION

In accordance with one aspect of the invention, a method of handling a subscriber's voice mail message in a telephone network message system comprises receiving an incoming call from a caller, prompting the caller to leave a message, recording the message on a voice mail server, sending a copy of the message to an email server, notifying the subscriber of the message sent to the email server, and updating the status of the message in the voice mail server and the email server when the subscriber accesses one of the voice mail or email servers to retrieve the message.

In accordance with another aspect of the invention, a method of handling an email message of a subscriber comprises receiving an email message through an email server, sending a copy of the email message to a voice mail server, converting the message to an audio format, saving the converted message on the voice mail server, and updating the status of the message in the voice mail server and the email server when the subscriber accesses one of the email or voice mail servers to retrieve the message.

In accordance with yet another aspect of the invention, an apparatus for processing voice mail messages in an integrated message management system includes a voice mail server that records and stores incoming voice mail messages, sends copies of incoming messages to an email server, and provides an indication of the retrieval status of the messages; an email server that stores voice mail messages as email, sends notice of new messages to a subscriber, and provides an indication of the retrieval status of the messages; and a message manager that links together the voice mail server and the email server, controls interaction between the voice mail server and the email server, updates a retrieval status indicator on the voice mail server when the subscriber accesses a message on the email server, and updates a retrieval status indicator on the email server when the subscriber accesses a message on the voice mail server.

Advantages provided by the invention include increased convenience for subscribers because of the immediate updating of messages on both the email server and voice mail server.

Other features, advantages, and aspects of the invention will become apparent upon review of the succeeding description taken in connection with the accompanying drawings. The invention, though, is pointed out with particularity by the appended claims.

DESCRIPTION OF ILLUSTRATIVE EMBODIMENTS

Figure 1:
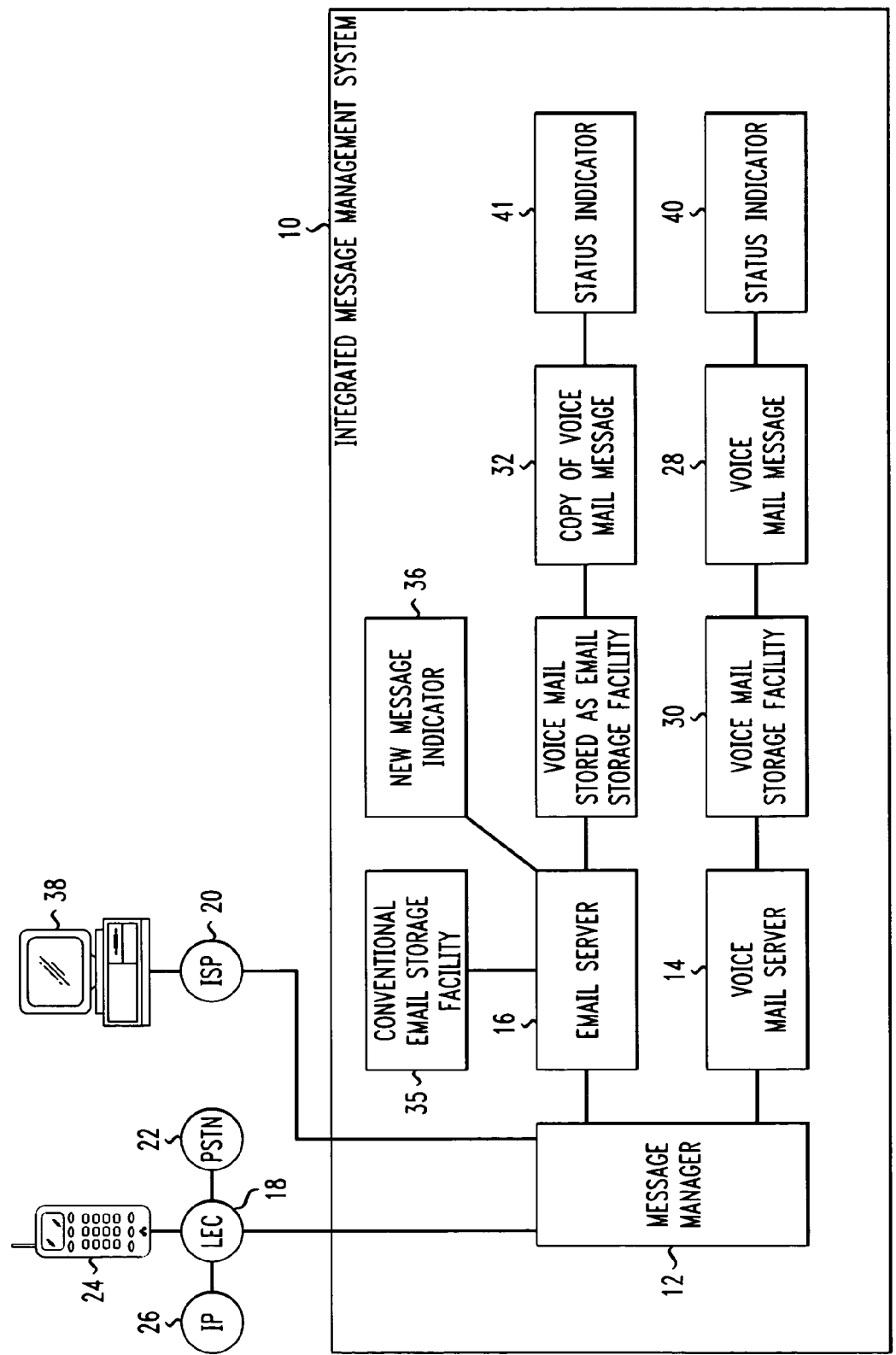
FIG. 1 depicts an embodiment of an integrated message management system for a subscriber with an "always on" Internet connection in accordance with one aspect of the invention.

FIG. 1 depicts an integrated message management system 10 for a subscriber with an "always on" Internet connection such as DSL, cable, or fixed wireless. The integrated message management system 10 comprises a message manager 12, a voice mail server 14, and an email server 16 that are functionally operative as part of a common system, but could reside on separate systems. Message manager 12 controls the connection of voice mail server 14 and email server 16 to a local exchange carrier (LEC) 18 and to an Internet service provider (ISP) 20. The local exchange carrier 18 routes an incoming call to the message manager 12 when the incoming call encounters a busy signal or is not answered. LEC is used in a generic sense, and may comprise a PSTN, HFC, cable IP, wireless, or other network. The incoming call may originate from a conventional telephone (PSTN) 22, a cellular or wireless phone 24, or an IP device 26 (such as a VoIP device), or any other communication device, e.g., a personal digital assistant (PDA). Message manager 12 also directs calls to the voice mail server 14 when the subscriber is not available. Voice mail server 14, for example, may prompt a caller to leave a message, record the message, or save the message as a conventional voice mail message 28. Voice mail server 14 includes a voice mail box 30 in which the message 28 is stored. After the message 28 is recorded, the voice mail server 14 sends a copy of the message to the email server 16. This copy can be an audio version or text version of the voice mail message. Email server 16 saves the copy of the message as an email message 32. Email server 16 includes a "voice mail stored as email" storage facility 34 in which the copy of the message 32 is stored. For the added convenience of the subscriber, "Voice mail stored as email" facility 34 keeps voice mail messages stored on the email server separate from conventional email messages, which are stored on conventional email message facility 35. Email server 16 also contains a new message indicator generator 36. New message indicator generator 36 sends a signal to a PC 38 through the Internet Service Provider 20 of the subscriber to alert the subscriber to the presence of a new message. PC 38 may itself function as a VoIP device to originate a call or to receive a call in order to communicate with another Internet device, thereby bypassing LEC 18 altogether. Thus, an aspect of the invention includes an embodiment that excludes an LEC or comparable device.

Voice mail server 14 includes a voice mail status indicator 40 for each voice mail message 28. Voice mail status indicator generator 40 generates an indicator that reflects the status of the voice mail message 28 (retrieved, deleted, save as new), and can be changed by the subscriber upon retrieving the message 28. Email server 16 includes a "voice mail stored as email" status indicator generator 41 for generating an indicator in response to each email copy message 32. The indicator generator 41 indicates the status of the email copy of the message 32 (retrieved, deleted, save as new), and can be changed by the subscriber upon retrieving the copy of the message 32.

Voice mail server 14 updates the voice mail status indicator 40 generator upon receipt of a message 28 on the voice mail server 14 when the subscriber retrieves the message 28 from the voice mail server 14 through the local exchange carrier 18. Message manager 12 detects the update of the voice mail status indicator 40 generated by the generator for the voice mail message 28, and immediately sends a signal controlling the email server 16 to update the "voice mail stored as email" status indicator generator 41 upon receipt of the corresponding email copy of the message 32. Email server 16 updates the "voice mail stored as email" status indicator 41 generator upon receipt of the corresponding email copy of the message 32 immediately as the voice mail server 14 updates the voice mail status indicator 40 for the voice mail message 28, thus eliminating any need for a periodic synchronization process.

Email server 16 updates the "voice mail stored as email" status indicator generator 41 upon receipt an email copy of a message 32 on the email server 16 when the subscriber retrieves the message 32 from the email server 16 through the Internet Service Provider 20. Message manager 12 detects the update of the "voice mail stored as email" status indicator generator 41 for the email copy of the message 32, and immediately sends a signal controlling the voice mail server 14 to update the voice mail status indicator generator 40 for the corresponding voice mail message 28. Voice mail server 14 updates the voice mail status indicator generator 40 for the corresponding voice mail message 28 immediately as the email server 16 updates the "voice mail stored as email" status indicator 41 for the email copy of the message 32, thus eliminating any need for a periodic synchronization process.

Figure 2:
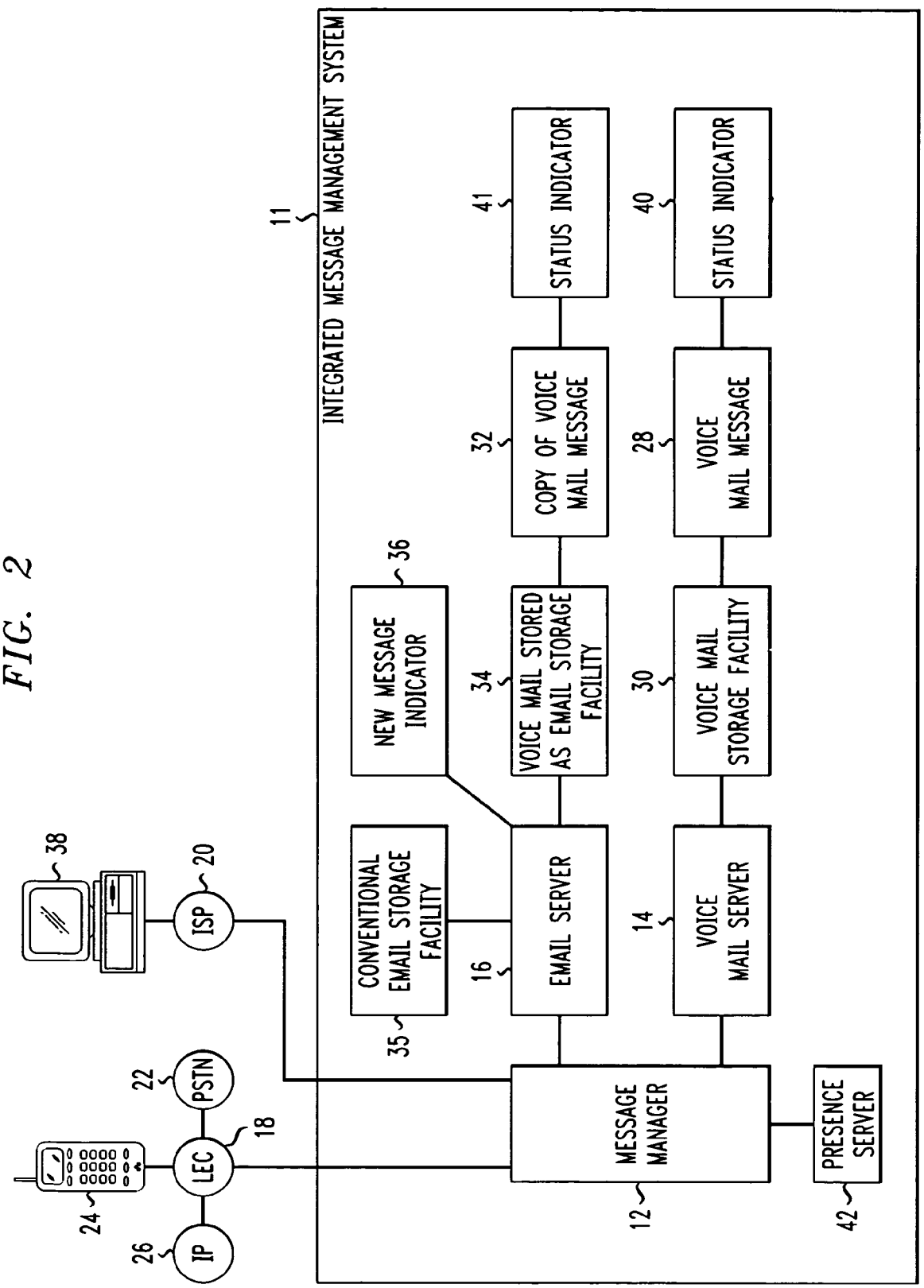
FIG. 2 shows another embodiment of an integrated message management system for a subscriber with a dial-up Internet connection.

FIG. 2 depicts an alternate embodiment of an integrated message management system 11 with a dial-up Internet connection instead of the "always on" Internet connection depicted in FIG. 1. This embodiment operates similarly to the embodiment in FIG. 1, but includes a presence server 42 in addition to the message manager 12, voice mail server 14, and email server 16. Presence server 42 uses subscriber identity information and the "ping" command to detect whether the subscriber is connected to the Internet. Upon detecting the presence of the subscriber on the Internet, presence server 42 sends a signal to the email server 16 "informing" the email server 16 of the presence of the subscriber on-line. Email server 16 sends the new message indicator signal 36 only after receiving the signal from the presence server 42.

Figure 3:
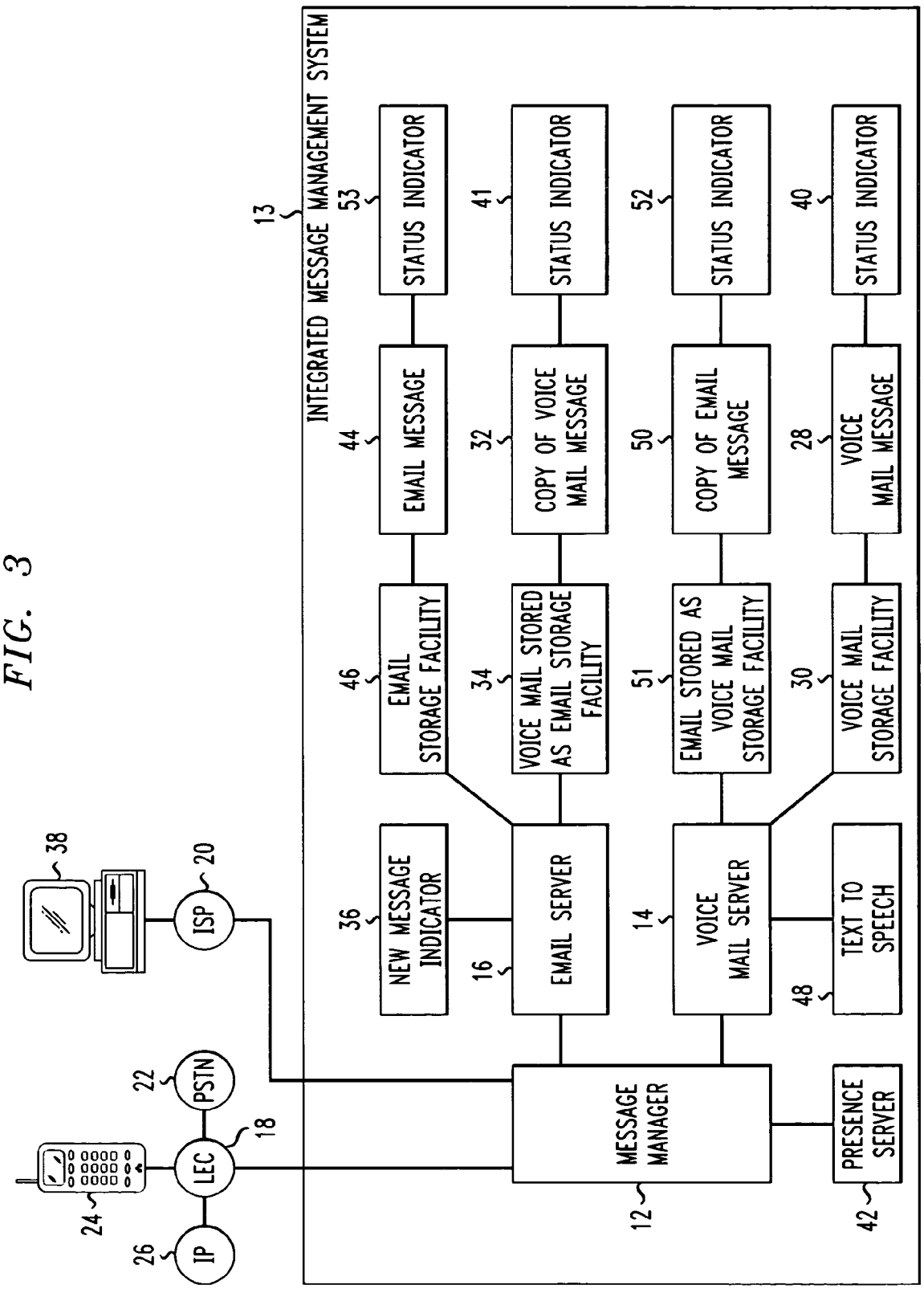
FIG. 3 shows yet another embodiment of an integrated message management system that manages incoming email messages in addition to incoming voice mail messages.

FIG. 3 shows an embodiment of an integrated message system 13 that manages incoming email messages in addition to incoming voice mail messages. The system 13 has elements in common with the systems 10 and 11 of FIGS. 1 and 2, respectively. Like elements have been identified by like reference numbers. Email server 16, which includes an email storage facility 46, for storing an incoming email message 44. Email server 16 sends a copy of an email message 44 to the voice mail server 14. Voice mail server 14 includes a text to speech conversion module 48 that converts the received email message 44 to an audio file 50. Voice mail server 14 further includes an "email stored as voice mail" storage facility 51 that stores the audio file 50. "Email stored as voice mail" facility 51 keeps email stored on the voice mail server separate from conventional voice mail messages 30 for the added convenience of the subscriber. This embodiment of the invention includes a presence server 42 when used for a subscriber with a dial-up Internet connection, as described in connection with FIG. 2.

Voice mail server 14 includes an "email stored as voice mail" status indicator generator 52 for generating an indication for each audio file 50 stored on the voice mail server 14. "Email stored as voice mail" status indicator generator 52 for indicating the status of the audio file 50 (retrieved, deleted, save as new) and can be changed by the subscriber upon retrieving the audio file 50. Email server 16 includes an email status indicator generator 53 for generating an indication for each email message 44. Email status indicator 53 generator for indicating indicates the message 44 (retrieved, deleted, save as new) and can be changed by the subscriber upon retrieving the message 44.

Voice mail server 14 updates the "email stored as voice mail" status indicator generator 52 of an audio file 50 on the voice mail server 14 when the subscriber retrieves the audio file 50 from the voice mail server 14 through the local exchange carrier 18. Message manager 12 detects the update of the "email stored as voice mail" status indicator 52 generator for the audio file 50, and immediately sends a signal controlling the email server 16 to update the email status indicator 53 generator for the corresponding email message 44. Email server 16 updates the email status indicator 53 for the corresponding email message 44 immediately as the voice mail server 14 updates the "email stored as voice mail" status indicator generator 52 for the audio file 50, thus eliminating any need for a periodic synchronization process.

Email server 16 updates the email status indicator 53 generator in response to an email message 44 on the email server 16 when the subscriber retrieves the message 44 from the email server 16 through the Internet Service Provider 20. Message manager 12 detects the update of the indicator of the email status indicator generator 53 for the email message 44, and immediately sends a signal controlling the voice mail server 14 to update the "email stored as voice mail" status indicator 52 generator for the corresponding audio file copy of the message 50. Voice mail server 14 updates the "email stored as voice mail" status maintained by indicator generator 52 for the corresponding audio file 32, immediately as the email server 14 updates the email status indicator 53 for the email message 44, thus eliminating any need for a periodic synchronization process.

Figure 4A:
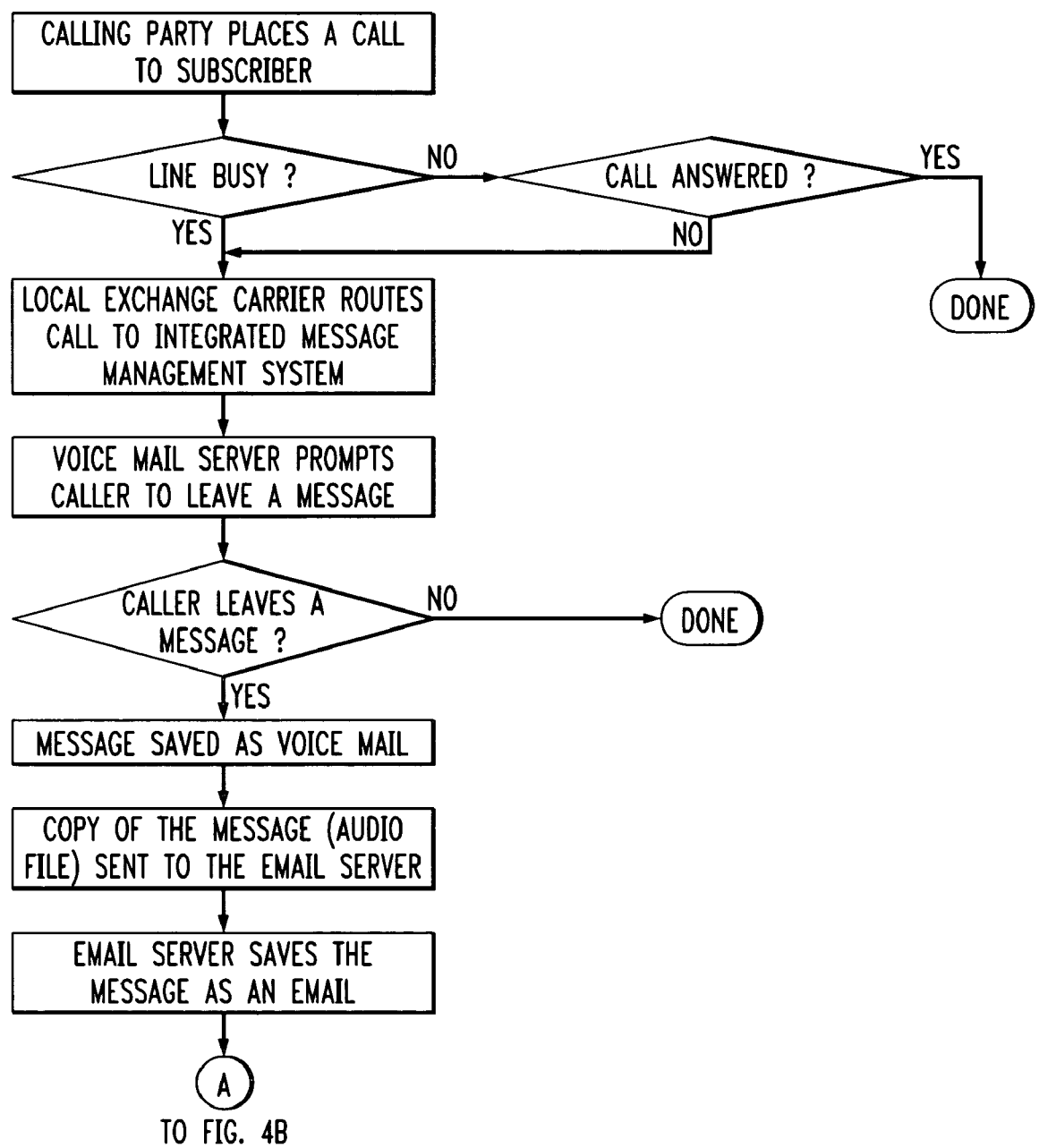
FIGS. 4A & 4B illustrate a sequence of events occurring during operation of the exemplary integrated message management system of FIG. 1.
Figure 4B:
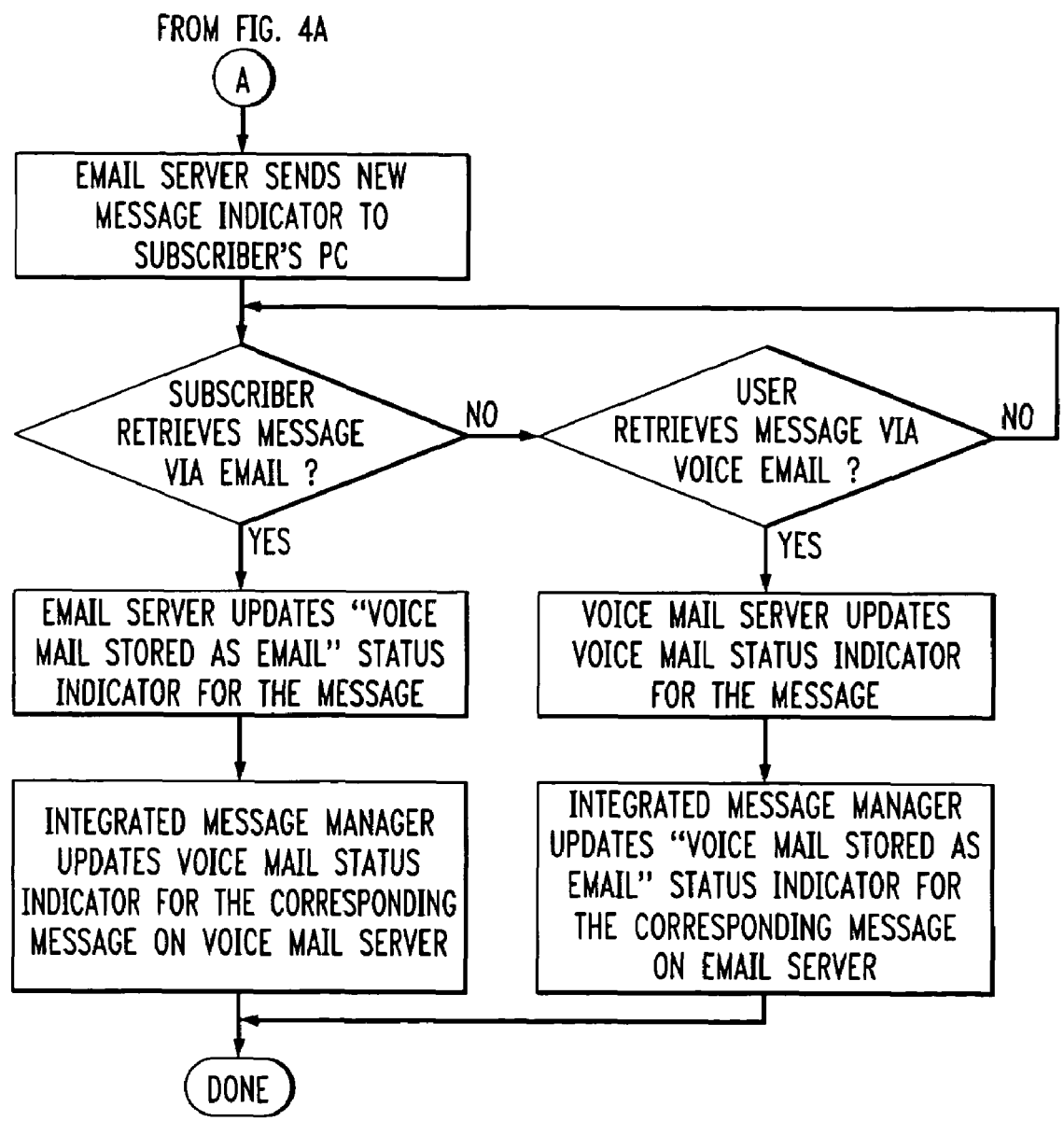

FIG. 4 illustrates a sequence of events occurring during operation of the exemplary integrated message management system 10 for a subscriber with an "always on" Internet connection such as DSL, cable, or fixed wireless. When a caller places a call to the subscriber, and encounters a busy signal or no answer, the local exchange carrier 18 routes the call to a message manager 12. Message manager 12 directs the call to a voice mail server 14. Voice mail server 14 prompts the subscriber to leave a message. Voice mail server 14 records this message and saves it as a conventional voice mail message 28 in the voice mail box 30. Voice mail server then sends a copy of the voice mail message 32 to an email server 16. Email server 16 saves the copy of the voice mail message 32 as an email in the "voice mail stored as email" box 34. Email server 16 saves this message 32 in the form of an audio file.

Email server 16 then sends a new message indicator 26 to a PC 38 via an Internet Service Provider 20. Subscriber then has the option to retrieve the voice mail message 28 from the voice mail server 14 via the local exchange carrier 18, or to retrieve the email copy of the voice mail message 32 from the email server 16 via the Internet Service Provider 20.

When the subscriber retrieves the copy of the message 32 from the email server 16, the email server 16 updates the "voice mail stored as email" status of the indicator generator 41 for the copy of the message 32. Message manager 12 immediately detects the update of the "voice stored as email" status indicator generator 41 for the email copy of the message 32, and sends a signal controlling the voice mail server 14 to update the voice mail status indicator 40 for the corresponding voice mail message 28.

When the subscriber retrieves the voice mail message 28 from the voice mail server 14, the voice mail server 14 updates the voice mail status indicator 40 for the message 28. Message manager 12 immediately detects the update of the voice mail status indicator 40 for the voice mail message 28, and sends a signal controlling the email server 16 to update the "voice mail stored as email" status indicator generator 41 for the corresponding email copy of the message 32.

Figure 5A:
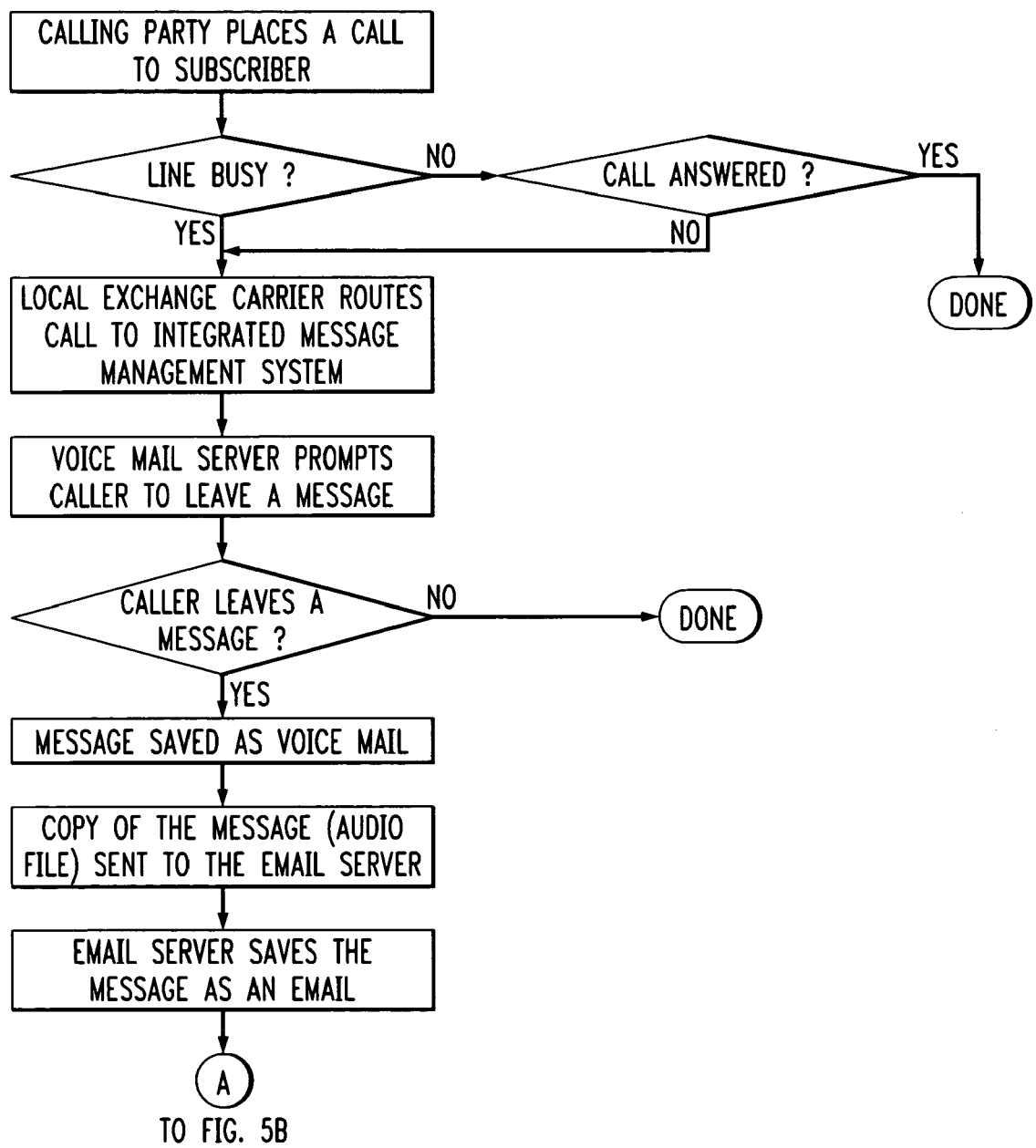
FIGS. 5A & 5B illustrate a sequence of events occurring during operation of an embodiment of an integrated message management system of FIG. 2.

FIG. 5 illustrates a sequence of events occurring during operation of the embodiment of an integrated message management system 11 for a subscriber with a dial-up Internet connection. When a caller places a call to the subscriber and encounters a busy signal or no answer, the local exchange carrier 18 routes the call to a message manager 12. Message manager 12 directs the call to a voice mail server 14. Voice mail server 14 prompts the subscriber to leave a message. Voice mail server 14 records this message and saves it as a conventional voice mail message 28 in the voice mail box 30. Voice mail server 14 then sends a copy of the voice mail message 32 to an email server 16. Email server 16 saves the copy of the voice mail message 32 as an email in the "voice mail stored as email" box 34. Email server 16 saves this message 32 in the form of an audio file.

Figure 5B:
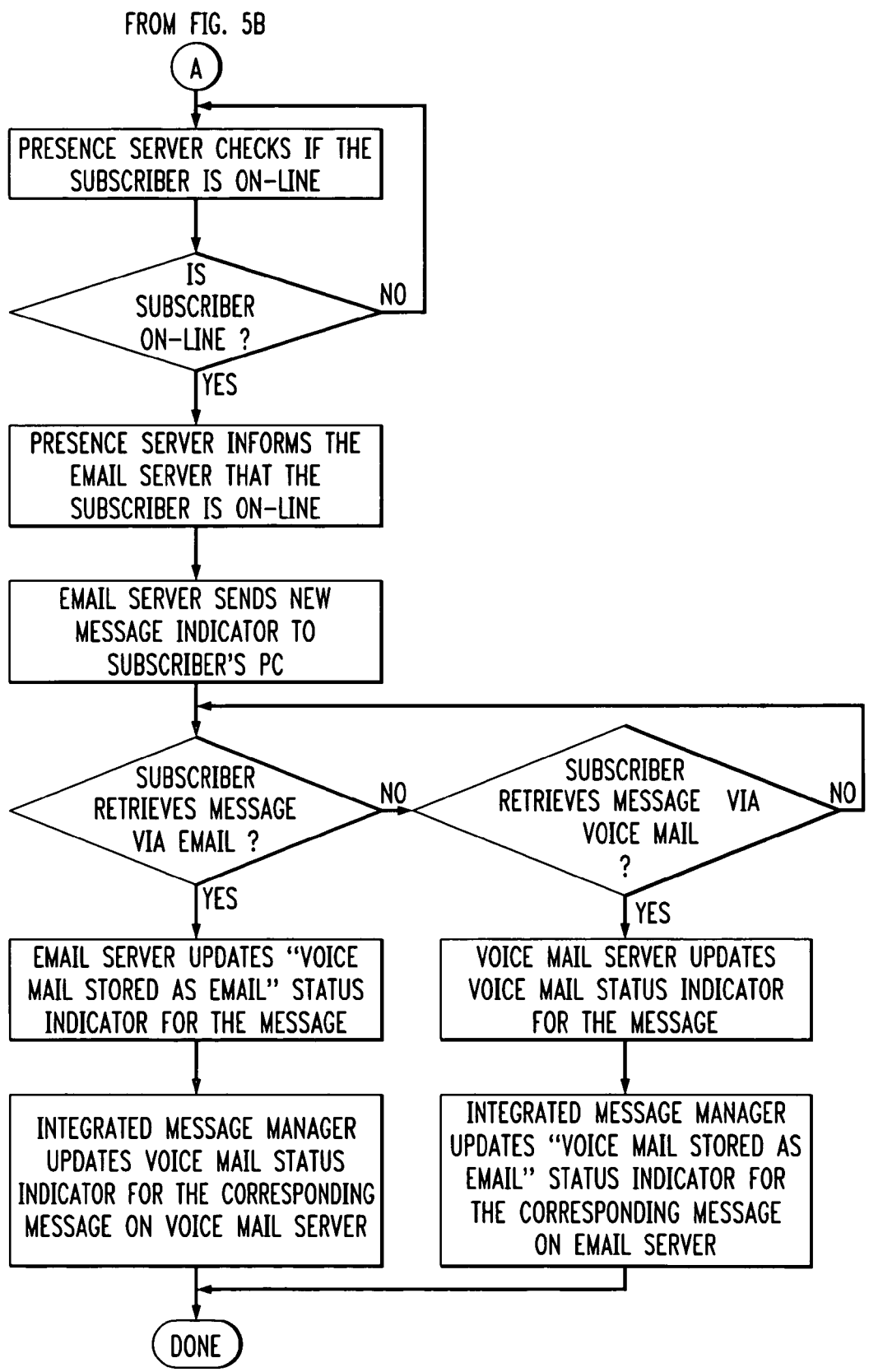

As shown in FIG. 5B, presence server 42 uses subscriber information and the "ping" command to determine whether the subscriber is connected to the Internet. If the subscriber is connected to the Internet, the presence server 42 sends a signal to the email server 16 "informing" the email server 16 of the Internet presence of the subscriber. If the subscriber is not connected to the Internet, the presence server 42 continues to "ping" the subscriber until the subscriber connects to the Internet. Upon receiving the signal from the presence server 42, the email server 16 sends a new message indicator 26 to a PC 38 via the Internet Service Provider 20. Detection of the on-line presence of the subscriber assures that the subscriber will receive notification of a new message. Subscriber then has the option to retrieve the voice mail message 28 from the voice mail server 14 via the local exchange carrier 18, or to retrieve the email copy of the voice mail message 32 from the email server 16 via the Internet Service Provider 20.

When the subscriber retrieves the copy of the message 32 from the email server 16, the email server 16 updates the "voice mail stored as email" status indicator 41 for the copy of the message 32. Message manager 12 immediately detects the update of the "voice mail stored as email" status indication of the indicator 41 generator for the email copy of the message 32, and sends a signal controlling the voice mail server 14 to update the voice mail status indication of the indicator generator 41 for the corresponding voice mail message 28.

When the subscriber retrieves the voice mail message 28 from the voice mail server 14, the voice mail server 14 updates the voice mail status indication of the indicator 40 generator for the message 28. Message manager 12 immediately detects the update of the voice mail status indication of the indicator 40 generator for the voice mail message 28, and sends a signal controlling the email server 16 to update the "voice mail stored as email" status indication of the indicator generator 41 for the corresponding email copy of the message 32.

Figure 6:
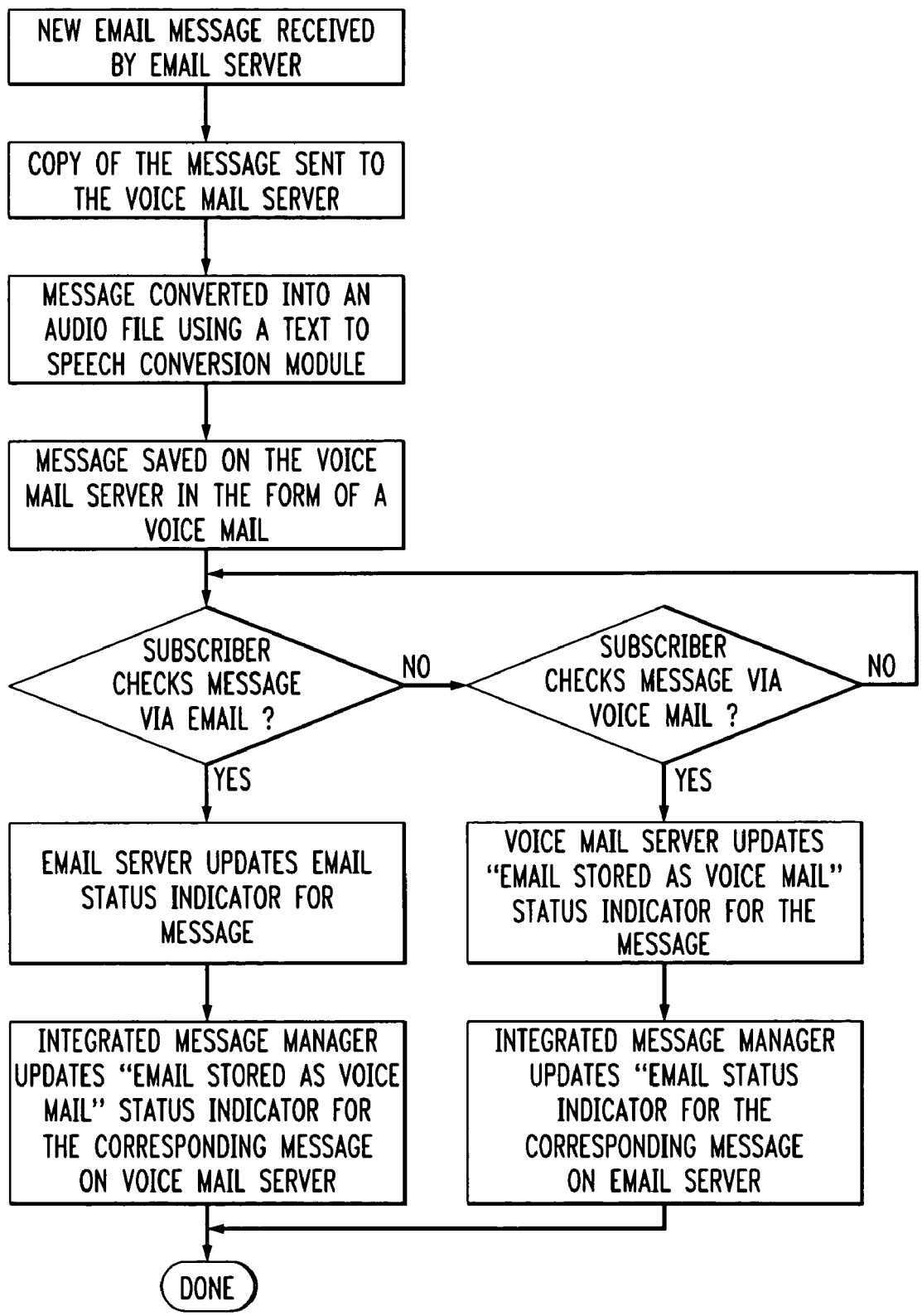
FIG. 6 illustrates a sequence of events occurring during operation of an embodiment of an integrated message management system of FIG. 3.

FIG. 6 depicts a sequence of events occurring during operation of the embodiment of an integrated message management system 13 for managing incoming email messages in an alternate embodiment of the invention. An email server 16 saves an incoming email message 44 in an email box 46. Email server then sends a text copy of the email message 44 to a voice mail server 14. Voice mail converts the text copy of the message 44 to an audio file 50 using a text-to-speech conversion module 48. Voice mail server 14 then saves the audio copy of the email message 50 in the "email stored as voice mail" storage facility 51. Subscriber has the option to retrieve the original email message 44 from the email server 16 via an Internet Service Provider 20, or to retrieve the audio file copy of the email message 50 from the voice mail server 14 via the local exchange carrier 18.

When the subscriber retrieves the copy of the original email message 44 from the email server 16, the email server 16 updates the email status indicator generator 53 for the original message 44. Message manager 12 immediately detects the update of the email status indication provided by indicator 53 generator for the email message 44, and sends a signal controlling the voice mail server 14 to update the "email stored as voice mail" status indication generated by indicator 52 generator for the corresponding audio file copy of the message 50.

When the subscriber retrieves the audio file copy 50 from the voice mail server 14, the voice mail server 14 updates the "email stored as voice mail" status indication provided by the indicator generator 52 for the voice mail audio file 50. Message manager 12 immediately detects the update of the "email stored as voice mail" status indicator 52 for the audio file 50, and sends a signal controlling the email server 16 to update the email status indication provided by indicator generator 53 for the corresponding email message 44.

We claim:

1. In a messaging system, a method of handling a voice mail message and an email message of a subscriber comprising the steps of:
   receiving an incoming call from a caller,
   prompting the caller to leave a voice message,
   recording the voice message in a voice mail box storage facility on a voice mail server,
   recording the retrieval status of the voice message in a voice message status indicator on the voice mail server
   sending a copy of the voice message to an email server,
   saving the copied voice message in a voice message storage facility on the email server,
   recording the retrieval status of the voice message in a voice message status indicator on the email server,
   notifying the subscriber of the voice message sent to the email server,
   updating the retrieval status of the voice message in the voice message status indicator in the voice mail server and in the voice message status indicator in the email server when the subscriber accesses one of the voice mail and email servers to retrieve the voice message,
   receiving an email message through the email server,
   storing the email message in an email storage facility on the email server,
   sending a copy of the email message to the voice mail server,
   converting the email message to an audio format,
   saving the converted email message in a converted email storage facility on the voice mail server,
   recording the retrieval status of the converted email message in a converted email status indicator in the voice mail server, and
   updating the retrieval status of the email message in the email status indicator in the email server and in the converted email status indicator in the voice mail server when the subscriber accesses one of the email or voice mail servers to retrieve the email message and providing an indication as to whether the subscriber is connected to the Internet, and wherein the subscriber is notified of the voice message sent to the email server only if the subscriber is connected to the Internet.

2. The method as recited in claim 1, wherein in said sending a copy of the voice message to the email server step, the copy of the voice message is an audio version of the voice message recorded on the voice mail server.

3. The method as recited in claim 1, wherein in said sending a copy of the voice message to the email server step, the copy of the voice message is a text version of the voice message recorded on the voice mail server.

4. The method as recited in claim 1, wherein said converting the email message to an audio format step includes performing text-to-speech conversion.

5. An integrated message management system for processing voice mail messages and email messages including:
   a voice mail server that records and stores conventional voice mail messages in a voice mail box storage facility, sends copies of voice mail messages to an email server, and includes a status indicator for each of the voice mail messages stored in the voice mail box storage facility,
   an email server that stores voice mail messages as email in a "voice mail stored as email" storage facility, sends notice of new voice mail messages to a subscriber, and includes a status indicator for each of the voice mail messages stored as email messages, and
   wherein the email server also stores conventional email messages in an email storage facility, sends copies of the email messages to the voice mail server, and includes a status indicator for each of the conventional email messages,
   wherein the voice mail server converts the email messages to voice mail messages using a text-to-speech conversion module, stores the converted email messages in an "email stored as voice mail" storage facility and includes a status indicator for each converted email message,
   a message manager that links together the voice mail server and email server, controls all interaction between the voice mail server and email server, and
      updates the retrieval status indicator of a voice mail message on the voice mail server when the subscriber accesses the voice mail message as email on the email server,
      updates the retrieval status indicator of the voice mail message as email on the email server when the subscriber accesses the voice mail message on the voice mail server,
      updates the retrieval status indicator of the converted email message on the voice mail server when the subscriber accesses the email message on the email server, and
      updates the retrieval status indicator of the email message on the email server when the subscriber accesses the converted email message on the voice mail server and a presence server that provides indication as to whether the subscriber is connected to the Internet, and wherein the email server only sends notice to the subscriber if the presence server indicates that the subscriber is connected to the Internet.

* * * * *